United States Patent (10) Patent No.: US 12,015,717 B2
Castinado et al. (45) Date of Patent: Jun. 18, 2024

(54) SYSTEM FOR PROCESSING OFFLINE DIGITAL RESOURCE TRANSFERS USING A HARDWARE DEVICE BASED CRYPTOGRAPHIC APPLICATION

(71) Applicant: BANK OF AMERICA CORPORATION, Charlotte, NC (US)

(72) Inventors: Joseph Benjamin Castinado, North Glenn, CO (US); Kevin Graham Robberts, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 287 days.

(21) Appl. No.: 17/545,215

(22) Filed: Dec. 8, 2021

(65) Prior Publication Data

US 2023/0179427 A1 Jun. 8, 2023

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01)

(58) Field of Classification Search
CPC ........ H04L 9/3213; H04L 9/50; G06F 9/5027
See application file for complete search history.

(56) References Cited

U.S. PATENT DOCUMENTS

| 7,484,103 | B2 | 1/2009 | Woo et al. |
| 8,190,893 | B2 * | 5/2012 | Benson .............. G06Q 20/4014 713/168 |
| 8,612,439 | B2 | 12/2013 | Prahlad et al. |
| 8,745,755 | B2 | 6/2014 | Borzycki et al. |
| 9,678,896 | B2 | 6/2017 | OLoughlin et al. |
| 10,192,198 | B2 | 1/2019 | Nazzari et al. |
| 10,333,905 | B2 | 6/2019 | Leon |
| 10,523,707 | B2 | 12/2019 | Sharifi Mehr et al. |
| 10,574,692 | B2 | 2/2020 | Drake |
| 10,691,837 | B1 | 6/2020 | Martel et al. |
| 10,872,333 | B2 | 12/2020 | Dua |
| 11,010,485 | B1 | 5/2021 | Devlin et al. |
| 11,023,608 | B2 | 6/2021 | Adkins et al. |
| 11,295,318 | B2 * | 4/2022 | Andon ................ G06F 16/9537 |
| 11,756,053 | B2 * | 9/2023 | Andon .................. H04W 12/33 705/51 |
| 2016/0019536 | A1 | 1/2016 | Ortiz et al. |
| 2016/0253651 | A1 | 9/2016 | Park et al. |

(Continued)

*Primary Examiner* — Mohammed Waliullah
(74) *Attorney, Agent, or Firm* — Moore & Van Allen PLLC; Seongun M. Hong

(57) ABSTRACT

A system is provided for processing offline digital resource transfers using a hardware device based cryptographic application. In particular, the system may comprise a portable hardware device or chip that have a cryptographic application and key stored thereon. The hardware chip may further store information about a digital resource associated with the user. A user may, through a user computing device, initiate a digital resource transfer by retrieving a data record associated with the digital resource transfer from a terminal. The user computing device may then access the cryptographic application stored on the hardware chip, where the cryptographic application may use the cryptographic key to digitally sign the data record. In this way, the system provides a secure and efficient way to process offline digital resource transfers.

17 Claims, 3 Drawing Sheets

(56) References Cited

U.S. PATENT DOCUMENTS

| | | | |
|---|---|---|---|
| 2017/0109735 A1 | 4/2017 | Sheng et al. | |
| 2017/0228731 A1 | 8/2017 | Sheng et al. | |
| 2018/0123804 A1 | 5/2018 | Smith et al. | |
| 2019/0386969 A1 | 12/2019 | Verzun et al. | |
| 2020/0076606 A1* | 3/2020 | Burke | H04L 9/3234 |
| 2020/0167775 A1 | 5/2020 | Reese et al. | |
| 2020/0252394 A1 | 8/2020 | Momchilov et al. | |
| 2020/0258152 A1* | 8/2020 | Naggar | H04L 9/50 |
| 2020/0273048 A1* | 8/2020 | Andon | G06Q 30/0633 |
| 2020/0351092 A1* | 11/2020 | Madhuram | G06F 16/00 |
| 2020/0412733 A1 | 12/2020 | Leon | |
| 2021/0082044 A1* | 3/2021 | Sliwka | H04L 9/3255 |
| 2021/0141902 A1 | 5/2021 | Martel et al. | |
| 2021/0390531 A1* | 12/2021 | Voorhees | G06Q 20/367 |
| 2022/0058634 A1* | 2/2022 | Yantis | G06Q 20/40 |
| 2022/0188839 A1* | 6/2022 | Andon | G06F 16/9537 |
| 2022/0414621 A1* | 12/2022 | Parlotto | G06F 21/64 |
| 2023/0066630 A1* | 3/2023 | deWaide | G06Q 20/401 |
| 2023/0259919 A1* | 8/2023 | Dorward | G06Q 20/389 |
| | | | 705/66 |

\* cited by examiner

SYSTEM FOR PROCESSING OFFLINE DIGITAL RESOURCE TRANSFERS USING A HARDWARE DEVICE BASED CRYPTOGRAPHIC APPLICATION

FIELD OF THE INVENTION

The present disclosure embraces a system for processing offline digital resource transfers using a hardware device based cryptographic application.

There is a need for a way to efficiently and securely process offline digital resource transfers.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for processing offline digital resource transfers using a hardware device based cryptographic application. In particular, the system may comprise a portable hardware device or chip that have a cryptographic application and key stored thereon. The hardware chip may further store information about a digital resource associated with the user. A user may, through a user computing device, initiate a digital resource transfer by retrieving a data record associated with the digital resource transfer from a terminal. The user computing device may then access the cryptographic application stored on the hardware chip, where the cryptographic application may use the cryptographic key to digitally sign the data record. Once the data record has been digitally signed, the digital resources may be transferred according to the information about the digital resource stored on the hardware chip, even in the absence of an online network connection. Once an online connection is established for the user computing device, the user computing device may communicate with a third party entity's servers to perform reconciliation of digital resource transfer data. In this way, the system provides a secure and efficient way to process offline digital resource transfers.

Accordingly, embodiments of the present disclosure provide a system for processing offline digital resource transfers using a hardware device based cryptographic application, the system comprising a memory device with computer-readable program code stored thereon; a communication device; and a processing device operatively coupled to the memory device and the communication device, wherein the processing device is configured to execute the computer-readable program code to initiate a digital resource transfer request with a terminal computing device; retrieve digital resource transfer data from the terminal computing device; based on the digital resource transfer data, digitally sign a data record comprising the digital resource transfer data by accessing a cryptographic application stored within a hardware chip device, wherein the cryptographic application digitally signs the data record using a cryptographic key stored on the hardware chip device; transfer an amount of digital resources to the terminal computing device according to the digital resource transfer data; and transmit the data record comprising the digital resource transfer data to a third party entity database for reconciliation.

In some embodiments, initiating the digital resource transfer request comprises opening a secure communication channel with the terminal computing device in an offline mode.

In some embodiments, the data record comprises a public key associated with a user, wherein the cryptographic key stored on the hardware chip device is a private key associated with the user.

In some embodiments, the computer-readable program code further causes the processing device to execute one or more validation checks on the digital resource transfer data, the one or more validation checks comprising verifying that a user account comprises adequate digital resources to complete the digital resource transfer request; and verifying that the digital resources within the user account is of a correct type to complete the digital resource transfer request.

In some embodiments, the hardware chip device is a subscriber identity module ("SIM") card.

In some embodiments, retrieving the digital resource transfer data from the terminal computing device comprises connecting to the terminal computing device over a wireless communication channel.

In some embodiments, the data record is structured as a block of data to be appended to a distributed register.

Embodiments of the present disclosure also provide a computer program product for processing offline digital resource transfers using a hardware device based cryptographic application, the computer program product comprising at least one non-transitory computer readable medium having computer-readable program code portions embodied therein, the computer-readable program code portions comprising executable code portions for initiating a digital resource transfer request with a terminal computing device; retrieving digital resource transfer data from the terminal computing device; based on the digital resource transfer data, digitally signing a data record comprising the digital resource transfer data by accessing a cryptographic application stored within a hardware chip device, wherein the cryptographic application digitally signs the data record using a cryptographic key stored on the hardware chip device; transferring an amount of digital resources to the terminal computing device according to the digital resource transfer data; and transmitting the data record comprising the digital resource transfer data to a third party entity database for reconciliation.

In some embodiments, initiating the digital resource transfer request comprises opening a secure communication channel with the terminal computing device in an offline mode.

In some embodiments, the data record comprises a public key associated with a user, wherein the cryptographic key stored on the hardware chip device is a private key associated with the user.

In some embodiments, the computer readable program code portions further comprise executable portions for executing one or more validation checks on the digital resource transfer data, the one or more validation checks comprising verifying that a user account comprises adequate digital resources to complete the digital resource transfer request; and verifying that the digital resources within the user account is of a correct type to complete the digital resource transfer request.

In some embodiments, the hardware chip device is a subscriber identity module ("SIM") card.

In some embodiments, retrieving the digital resource transfer data from the terminal computing device comprises connecting to the terminal computing device over a wireless communication channel.

Embodiments of the present disclosure also provide a computer-implemented method for processing offline digital resource transfers using a hardware device based cryptographic application, wherein the computer-implemented method comprises initiating a digital resource transfer request with a terminal computing device; retrieving digital resource transfer data from the terminal computing device; based on the digital resource transfer data, digitally signing a data record comprising the digital resource transfer data by accessing a cryptographic application stored within a hardware chip device, wherein the cryptographic application digitally signs the data record using a cryptographic key stored on the hardware chip device; transferring an amount of digital resources to the terminal computing device according to the digital resource transfer data; and transmitting the data record comprising the digital resource transfer data to a third party entity database for reconciliation.

In some embodiments, initiating the digital resource transfer request comprises opening a secure communication channel with the terminal computing device in an offline mode.

In some embodiments, the data record comprises a public key associated with a user, wherein the cryptographic key stored on the hardware chip device is a private key associated with the user.

In some embodiments, the computer-implemented method further comprises executing one or more validation checks on the digital resource transfer data, the one or more validation checks comprising verifying that a user account comprises adequate digital resources to complete the digital resource transfer request; and verifying that the digital resources within the user account is of a correct type to complete the digital resource transfer request.

In some embodiments, the hardware chip device is a subscriber identity module ("SIM") card.

In some embodiments, retrieving the digital resource transfer data from the terminal computing device comprises connecting to the terminal computing device over a wireless communication channel.

In some embodiments, the data record is structured as a block of data to be appended to a distributed register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
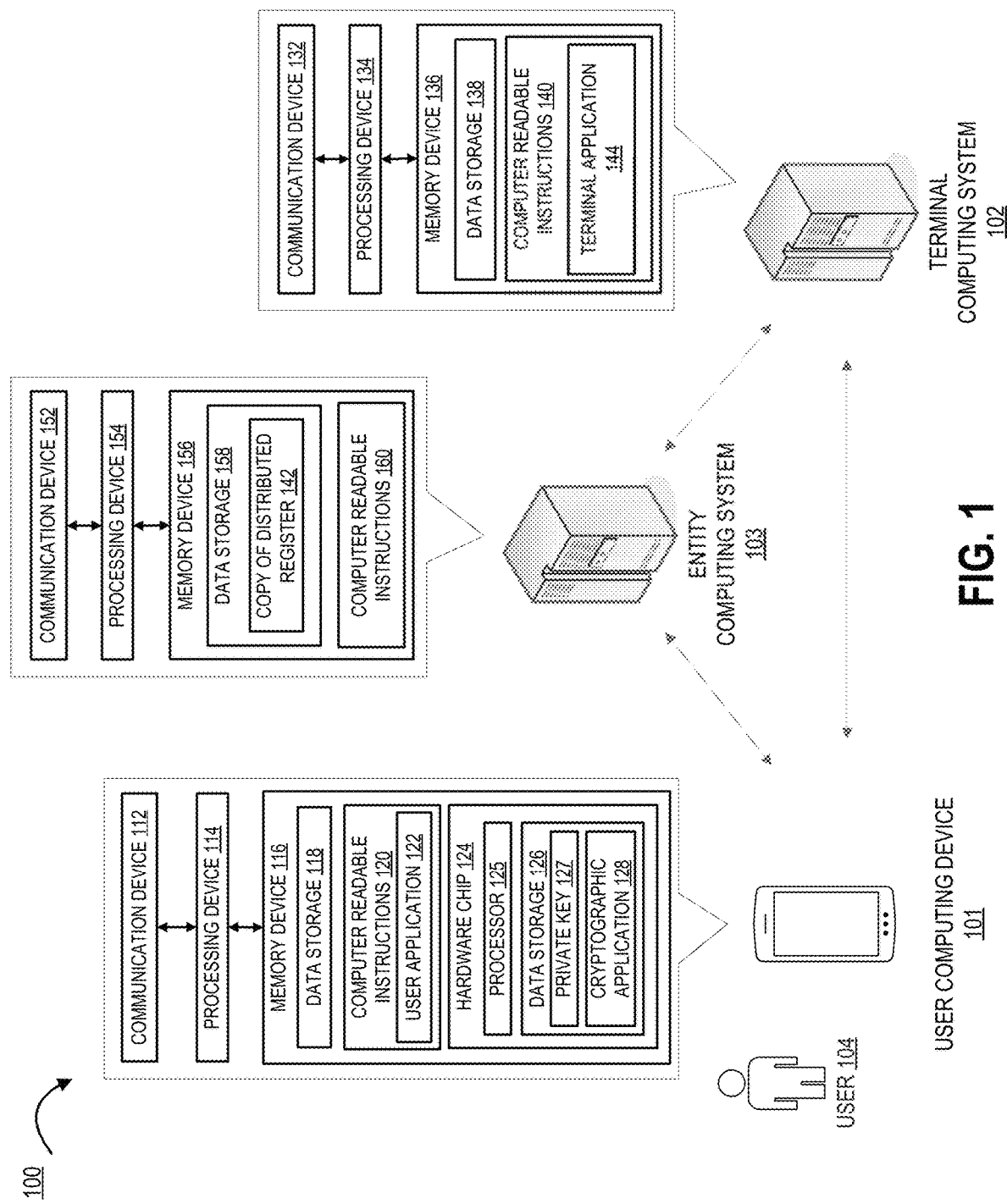
Figure 2:
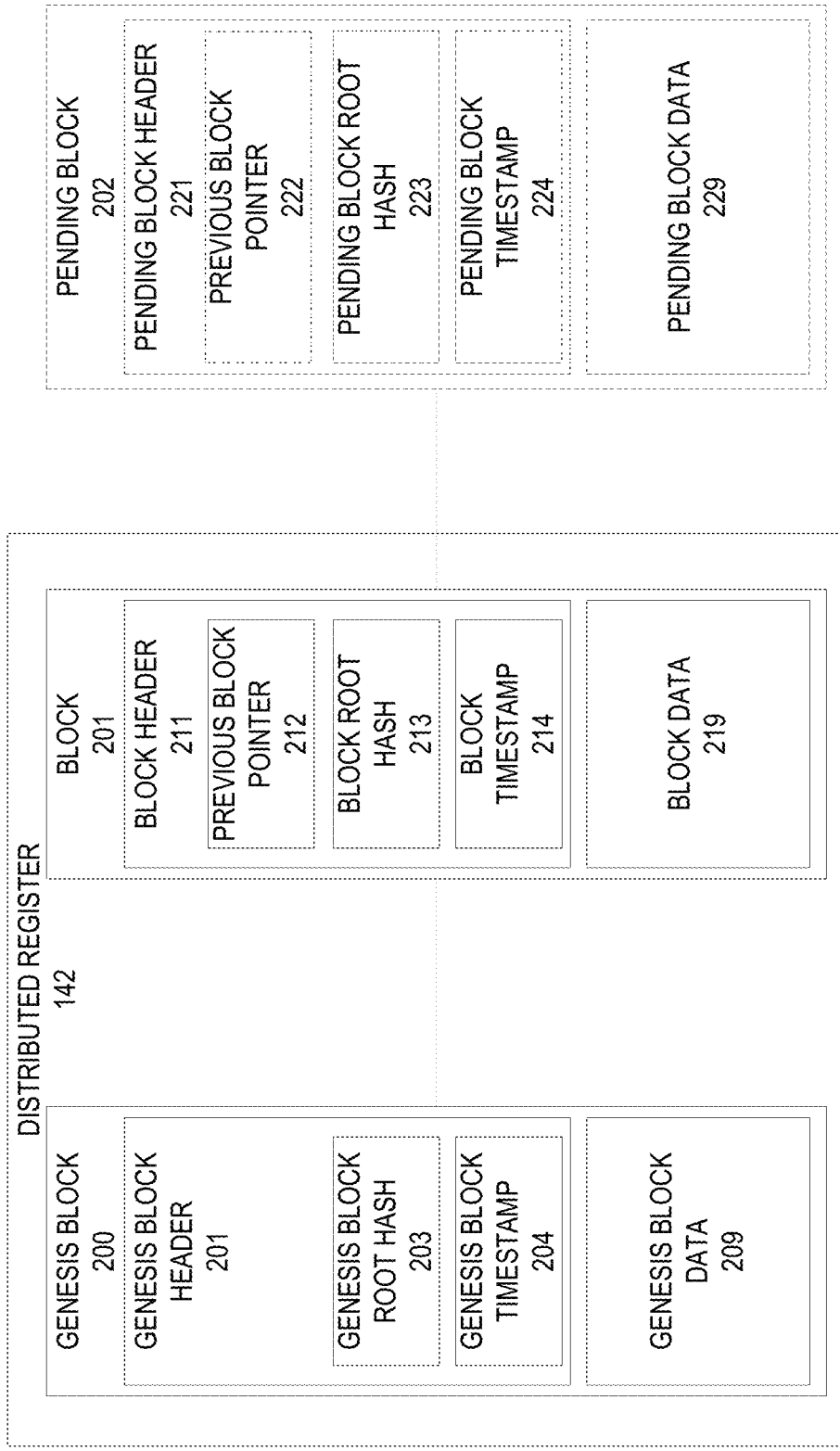
Figure 3:
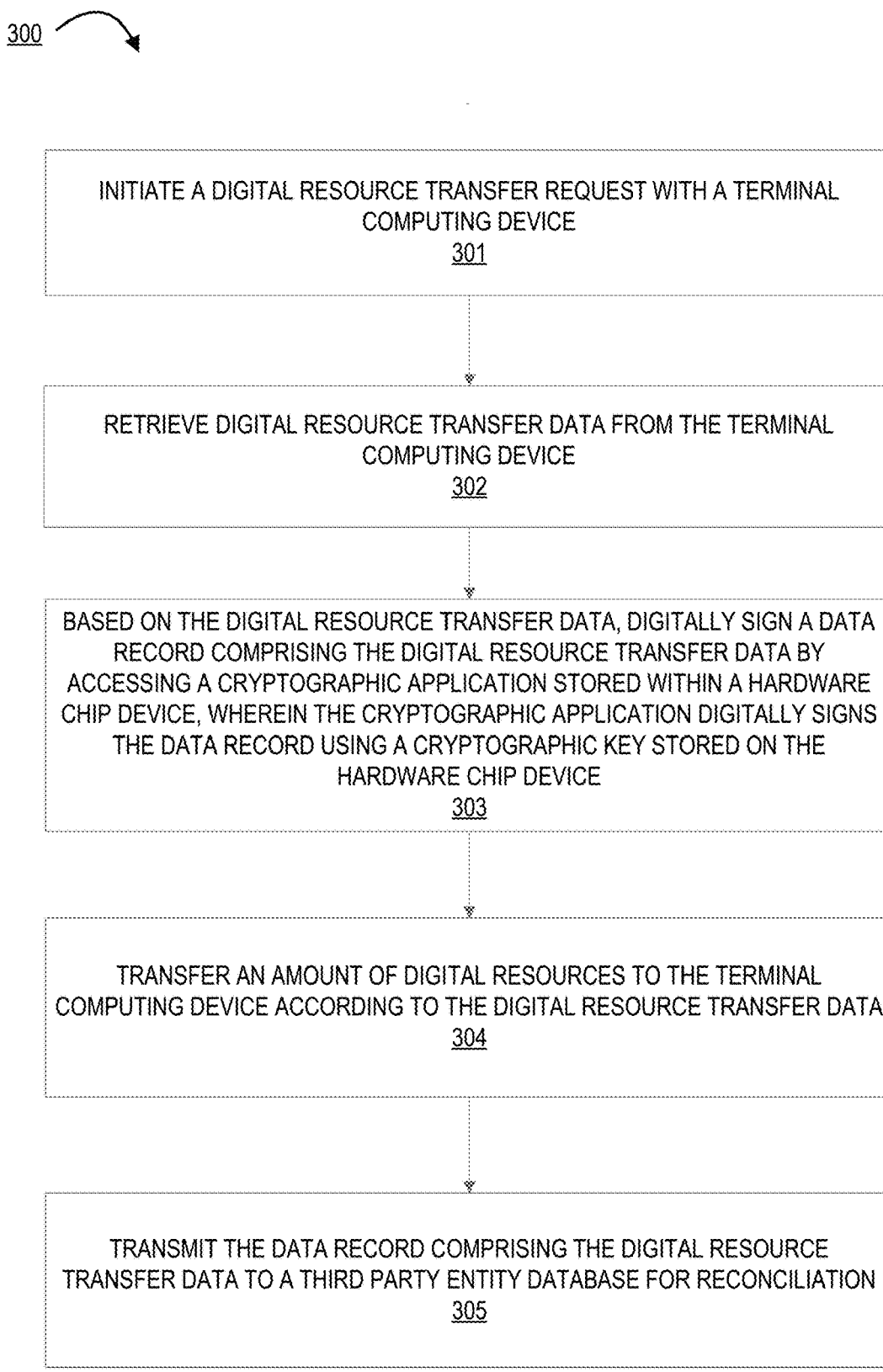

Having thus described embodiments of the invention in general terms, reference will now be made to the accompanying drawings, wherein:

FIG. 1 illustrates an operating environment for the digital resource transfer system, in accordance with one embodiment of the present disclosure;

FIG. 2 is a block diagram illustrating the data structures within an exemplary distributed register; and FIG. 3 illustrates a process flow for processing offline digital resource transfers using a hardware device based cryptographic application, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. A "digital resource" may refer to a resource that may exist in digital format (e.g., a digital currency). In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

The system as described herein provides a way to authenticate, authorize, and process digital resource transfers in an offline environment. Accordingly, the system may comprise a hardware device or chip that may be manufactured to store a cryptographic private key and an application to control access to said private key (e.g., a cryptographic application).

In this regard, the hardware device may be a subscriber identity module ("SIM") card configured to grant use of the private key to computing devices (e.g., smartphones, tablets, or the like) through the cryptographic application. Each SIM card may be created with a separate, unique private key which may then be associated with a user for the purpose of conducting resource transfers.

The user may then use the private key stored on the SIM card to initiate and process digital resource transfers. For instance, a user may use a mobile device (e.g., the user's smartphone) to interact with a computing terminal to initiate a transfer of digital resources belonging to the user. In this respect, the user's mobile device and/or the SIM card may store information about the digital resources of the user, such as an identification of the type of digital resource, the amount of digital resources available, and the like. In some embodiments, said information may be mirrored on a database hosted by a third party entity associated with the user. In such embodiments, the third party entity may maintain an account on behalf of the user, where the account may include an allocation of digital resources owned by the user.

To begin the process, the user's mobile device may retrieve a data record containing digital resource transfer data from the terminal by wireless communication channels (e.g., Wi-Fi, NFC, Bluetooth, or the like). The digital resource transfer data may include information such as the amount of digital resources to be transferred, sender and/or recipient information, timestamp data, or the like. In this respect, the data record comprise a public key associated with the user (and the private key stored on the SIM card). Upon retrieving the data record, the mobile device may access the private key stored on the SIM card to digitally sign the data record. In some embodiments, the mobile device may use the cryptographic application to perform one or more validation checks on the data record to ensure that the digital resource transfer will be valid. For instance, the validation checks may include reading the information about the digital resource to ensure that the user possesses an adequate amount of resources to complete the transfer.

Once the data record is digitally signed by the user's mobile device, the mobile device may read the information about the digital resource and transmit an amount of digital resources to the terminal in accordance with the digital resource transfer data. It should be noted that the digital resource transfer, in some embodiments, may be processed using data only from the mobile device (and SIM card) and terminal without the use of external servers or computing systems. In other words, the digital resource transfer may take place in an offline environment (e.g., without Internet access). Upon reconnecting to the Internet, the user computing device may transmit the digitally signed data record to the third party entity's servers for reconciliation of the user's account.

An exemplary embodiment is provided as follows. It should be understood that the example is provided for illustrative purposes only and is not intended to restrict the scope of the disclosure provided herein. In one embodiment, the user may wish to exchange an amount of digital currency (e.g., digital resources) for a good or service offered by a vendor. The digital resources of the user may be held in a user account maintained by a financial institution (e.g., a third party entity). To initiate the transaction (e.g., a digital resource transfer), the user may use a mobile device such as a smartphone to retrieve the transaction information (e.g., the types and/or amounts of resources to be exchanged) from a point-of-sale ("POS") system or terminal operated by the vendor.

In some embodiments, the information associated with the user's account may be stored within the user's smartphone or SIM card. For instance, the information may include balances of the digital resource, account numbers, and the like. In some embodiments, the information may be stored on the user's mobile device as a data record, where the data record may further comprise a public key associated with the user. Accordingly, the user's device may execute a number of checks to determine whether the transaction is valid (e.g., the account balance of digital resources may be verified to ensure that the user has enough digital currency to support the transaction). Once the validation checks have been completed, the user device may access the cryptographic application stored on the SIM card to digitally sign the data record using the private key associated with the user (which may be paired with the public key within the data record). By digitally signing the data record using the private key, the user is able to securely signify to other users and/or devices that the transaction has been authenticated and/or authorized by the user. Accordingly, the digital resources within the user's account may be transferred to the vendor's POS system in accordance with the transaction details retrieved from the POS system, and the balance within the user's account is thereby updated to reflect the transaction.

After the transaction has been completed, the user's mobile device may (e.g., at a later time once Internet connectivity has been re-established), upload the digitally signed data record to the financial institution. Based on the information within the data record, the financial institution may perform data reconciliation and update its database to reflect the signed transaction. In some embodiments, the information regarding the user's account (e.g., account balances, type of digital currency, the public key associated with the user, or the like) may be stored within a distributed register hosted at least partially by the entity. In such embodiments, the data record may be submitted to the nodes of the distributed register to be validated and/or appended to the distributed register. Because the entity has associated a particular public key with the user, the entity may be confident that a data record that has been digitally signed with the corresponding private key is authentic (e.g., the data record and associated transaction originates from and has been authorized by the user). In scenarios in which the user may switch SIM cards, the user may register the public key associated with the SIM card with the entity. In such embodiments, the new public key associated with the user may be appended to the distributed register. In this way, subsequent transfers of digital resources may be authenticated using the new key pair.

In another exemplary embodiment, the system as described herein may be used as a secure way for a user to access and view sensitive information intended to be viewed only by the user. For instance, a confidential document may be transmitted to the user's mobile device, where such confidential document may be encrypted using a public key associated with the user. The user may access the cryptographic application on the SIM card of the user's mobile device to decrypt the encrypted document using the private key stored within the SIM card. In this way, the private key remains unexposed to other devices, thereby reducing the possibility of unauthorized parties gaining access to sensitive information intended for use only by the user.

The system as described herein confers a number of technological advantages over conventional resource transfer systems. In particular, by using an on-chip implementation of the cryptographic key and associated application, the system supports offline resource transfers that do not require communications with any other servers or computing systems other than the terminal and the user's computing device. Furthermore, maintaining the private key on a hardware device provides a more secure way for a user to be authenticated and to authorize resource transfers.

Turning now to the figures, FIG. 1 illustrates an operating environment 100 for the digital resource transfer system, in accordance with one embodiment of the present disclosure. In particular, FIG. 1 illustrates a user computing device 101 that is operatively coupled, via a network, to a terminal computing system 102 and an entity computing system 103. In such a configuration, the user computing device 101 may transmit information to and/or receive information from the terminal computing system 102 and/or the entity computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the entity computing system 103 is depicted as a single unit, the operating environment 100 may comprise multiple entity computing systems (e.g., nodes that host a distributed register).

The network may be a system specific distributive network receiving and distributing specific network feeds and identifying specific network associated triggers. The network include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the user computing device 101 may be a portable computing system that may be used by a user 104 to initiate, authorize, and authenticate digital resource transfers. In this regard, the user computing device 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

Accordingly, the user computing device 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 is operatively coupled to the communication device 112 and the memory device 116. The processing device 114 uses the communication device 112 to communicate with the network and other devices on the network, such as, but not limited to the terminal computing system 102. The communication device 112 generally comprises a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise various types of information that may be relevant to the digital resource transfer process. The memory device 116 may further have computer-readable instructions 120 stored thereon, which in one embodiment includes computer-readable instructions of a user application 122. The user application 122 may be an application with which the user 104 may interact to initiate and process digital resource transfers.

The user computing device 101 may further comprise a hardware chip 124, which in some embodiments may be a SIM card or other type of integrated or detachable chip that may be inserted into the user computing device 101. The hardware chip 124 may comprise a processor 125 and data storage 126, where the data storage 126 may have a private key 127 and cryptographic application 128 stored thereon. The user application 122 of the user computing device 101 may communicate with the cryptographic application 128 (e.g., to digitally sign transactions using the private key 127). In this respect, the private key 127 may be maintained solely within the hardware chip 124 such that the private key 127 is not copied to or shared with other devices (which may include the user computing device 101). In this way, the system may ensure the authenticity of data record signed using the private key 127.

As further illustrated in FIG. 1, the operating environment 100 may further comprise a terminal computing system 102 in operative communication with the user computing device 101. In some embodiments, the terminal computing system 102 may be a computing system that may be operated by an entity (e.g., a vendor) that may be interacting with the user 104 (e.g., to conduct a digital resource transfer). Accordingly, the terminal computing system 102 may be a POS system or terminal operated by the vendor.

The terminal computing system 102 may comprise a processing device 134 operatively coupled to a communication device 132 and a memory device 136 having data storage 138 and computer readable instructions 140 stored thereon, where the computer readable instructions 140 may include a terminal application 144. The terminal application 144 may be configured to interact with the user computing device 101 over the network. In particular, the terminal application 144 may transmit digital resource transfer data (which may contain one or more parameters relating to the resource transfer) to the user computing device 101 over a wireless communication channel. In some embodiments, the terminal computing system 102 may also comprise a hardware device comprising a cryptographic key and cryptographic application. In such embodiments, the terminal computing system 102 may be configured to communicate directly with the cryptographic application 128 on the user computing device 101.

As further illustrated in FIG. 1, the entity computing system 103 may be a computing system that is hosted and/or operated by an entity with an established relationship with the user 104, such as a financial institution that hosts a user account containing digital resources owned the user. Accordingly, the entity computing system 103 may comprise a processing device 154 operatively coupled to a communication device 152 and a memory device 156 having data storage 158 and computer readable instructions 160 stored thereon. The data storage 158 of the memory device 156 may comprise a copy of a distributed register 142. The copy of the distributed register 142 may comprise information regarding the user 104 and/or the user account. For instance, such information may include account balances, public keys associated with the user computing device 101, past transactions, or the like. In other embodiments, account balances may be stored in a non-distributed manner within the memory device 156. The entity computing system 103 may receive data records from the user computing device 101 which may include digital resource transfer data associated with transactions processed by the user computing device 101 in an offline environment. In this way, the data within the entity computing system 103 may be synchronized with the data stored within the user computing device 101.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents, or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 illustrates a process flow 300 for processing offline digital resource transfers using a hardware device based cryptographic application. The process begins at block 301, where the system initiates a digital resource transfer request with a terminal computing device. The digital resource transfer request may be, for instance, a request submitted by a user to exchange an amount of digital currency belonging to the user for a particular good or service offered by a vendor. In this regard, the digital resource transfer request may be initiated by opening a secure communication channel with a terminal device (e.g., POS system) through wireless communication methods.

The process continues to block 302, where the system retrieves digital resource transfer data from the terminal computing device. Once the secure communication channel has been opened, the user's mobile device may read the digital resource transfer data, which may include various types of information regarding the digital resource transfer. For instance, if the digital resource transfer is a purchase of a good or service made with digital currency, the information may include the amount of digital currency to be paid by the user, an identification of the good or service to be acquired, or the like. In some embodiments, the digital resource transfer data may be compiled into a data record by the system or the user's mobile device. In other embodiments, the data record may be generated by the terminal computing device and made available to the user's mobile device.

The process continues to block 303, where the system, based on the digital resource transfer data, digitally signs a data record comprising the digital resource transfer data by accessing a cryptographic application stored within a hardware chip device, wherein the cryptographic application digitally signs the data record using a cryptographic key stored on the hardware chip device. At this stage, the system may further perform one or more validation checks on the digital resource transfer data, where such validation checks may include a verification of whether there is the user's account contains an adequate amount of digital resources for the digital resource transfer, whether the user account contains the correct type of digital resource, or the like. Upon completing the validation checks, the user's mobile device may communicate with the cryptographic application stored on the hardware chip device (e.g., a SIM card) to sign the data record. The cryptographic key may be a private key that is stored on the hardware chip device such that the cryptographic application controls the use of such private key. In this regard, the system may ensure that the private key is not exposed to other devices.

The process continues to block 304, where the system transfers an amount of digital resources to the terminal computing device according to the digital resource transfer data. In this regard, the system may transmit the data record to the terminal computing device, where the data record may include a user account identifier (e.g., a digital address such as a cryptographic hash) and the digital signature created by the cryptographic private key stored on the hardware chip device. In this way, the terminal computing device may receive the information needed to process the digital resource transfer while also being able to authenticate the digital resource transfer request as being genuine.

The process concludes at block 305, where the system transmits the data record comprising the digital resource transfer data to a third party entity database for reconciliation. In this regard, transferring the amount of digital resources to the terminal computing device may be executed in an offline environment in which neither the user computing device nor the terminal computing device are connected to the Internet. In such embodiments, the user computing device may be configured to transmit the data record to the third part entity database (e.g., a database operated by the financial institution which hosts the account of the user) when the user computing device regains online connectivity. Once the data record is transmitted to the third party entity database, the entity may use the information in the data record to reconcile its records. By maintaining a record of the user's account within the third party entity database and the mobile device (or SIM card therein), the system may support the use of offline transfers in which network connectivity is limited.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing offline digital resource transfers using a hardware device based cryptographic application, the system comprising:
   a memory device with computer-readable program code stored thereon;
   a communication device; and
   a processing device operatively coupled to the memory device and the communication device, wherein the processing device is configured to execute the computer-readable program code to:
   initiate a digital resource transfer request with a terminal computing device wherein initiating the digital resource transfer request comprises opening a secure communication channel with the terminal computing device in an offline mode without internet access;

retrieve digital resource transfer data from the terminal computing device;

based on the digital resource transfer data, digitally sign a data record comprising the digital resource transfer data by accessing a cryptographic application stored within a hardware chip device, wherein the cryptographic application digitally signs the data record using a cryptographic key stored on the hardware chip device;

transfer an amount of digital resources to the terminal computing device according to the digital resource transfer data;

determine that an internet connection has been reestablished; and based on determining that the internet connection has been reestablished, transmit the data record comprising the digital resource transfer data to a third party entity database for reconciliation.

2. The system according to claim 1, wherein the data record comprises a public key associated with a user, wherein the cryptographic key stored on the hardware chip device is a private key associated with the user.

3. The system according to claim 1, wherein the computer-readable program code further causes the processing device to execute one or more validation checks on the digital resource transfer data, the one or more validation checks comprising:

verifying that a user account comprises adequate digital resources to complete the digital resource transfer request; and verifying that the digital resources within the user account is of a correct type to complete the digital resource transfer request.

4. The system according to claim 1, wherein the hardware chip device is a subscriber identity module ("SIM") card.

5. The system according to claim 1, wherein retrieving the digital resource transfer data from the terminal computing device comprises connecting to the terminal computing device over a wireless communication channel.

6. The system according to claim 1, wherein the data record is structured as a block of data to be appended to a distributed register.

7. A computer program product for processing offline digital resource transfers using a hardware device based cryptographic application, the computer program product comprising at least one non-transitory computer readable medium having computer-readable program code portions embodied therein, the computer-readable program code portions comprising executable code portions for:

initiating a digital resource transfer request with a terminal computing device, wherein initiating the digital resource transfer request comprises opening a secure communication channel with the terminal computing device in an offline mode without internet access;

retrieving digital resource transfer data from the terminal computing device;

based on the digital resource transfer data, digitally signing a data record comprising the digital resource transfer data by accessing a cryptographic application stored within a hardware chip device, wherein the cryptographic application digitally signs the data record using a cryptographic key stored on the hardware chip device;

transferring an amount of digital resources to the terminal computing device according to the digital resource transfer data;

determining that an internet connection has been reestablished; and based on determining that the internet connection has been reestablished, transmitting the data record comprising the digital resource transfer data to a third party entity database for reconciliation.

8. The computer program product according to claim 7, wherein the data record comprises a public key associated with a user, wherein the cryptographic key stored on the hardware chip device is a private key associated with the user.

9. The computer program product according to claim 7, wherein the computer readable program code portions further comprise executable portions for executing one or more validation checks on the digital resource transfer data, the one or more validation checks comprising:

verifying that a user account comprises adequate digital resources to complete the digital resource transfer request; and verifying that the digital resources within the user account is of a correct type to complete the digital resource transfer request.

10. The computer program product according to claim 7, wherein the hardware chip device is a subscriber identity module ("SIM") card.

11. The computer program product according to claim 7, wherein retrieving the digital resource transfer data from the terminal computing device comprises connecting to the terminal computing device over a wireless communication channel.

12. A computer-implemented method for processing offline digital resource transfers using a hardware device based cryptographic application, wherein the computer-implemented method comprises:

initiating a digital resource transfer request with a terminal computing device, wherein initiating the digital resource transfer request comprises opening a secure communication channel with the terminal computing device in an offline mode without internet access;

retrieving digital resource transfer data from the terminal computing device;

based on the digital resource transfer data, digitally signing a data record comprising the digital resource transfer data by accessing a cryptographic application stored within a hardware chip device, wherein the cryptographic application digitally signs the data record using a cryptographic key stored on the hardware chip device;

transferring an amount of digital resources to the terminal computing device according to the digital resource transfer data;

determining that an internet connection has been reestablished; and based on determining that the internet connection has been reestablished, transmitting the data record comprising the digital resource transfer data to a third party entity database for reconciliation.

13. The computer-implemented method according to claim 12, wherein the data record comprises a public key associated with a user, wherein the cryptographic key stored on the hardware chip device is a private key associated with the user.

14. The computer-implemented method according to claim 12, wherein the computer-implemented method further comprises executing one or more validation checks on the digital resource transfer data, the one or more validation checks comprising:

verifying that a user account comprises adequate digital resources to complete the digital resource transfer request; and verifying that the digital resources within the user account is of a correct type to complete the digital resource transfer request.

15. The computer-implemented method according to claim 12, wherein the hardware chip device is a subscriber identity module ("SIM") card.

16. The computer-implemented method according to claim 12, wherein retrieving the digital resource transfer data from the terminal computing device comprises connecting to the terminal computing device over a wireless communication channel.

17. The computer-implemented method according to claim 12, wherein the data record is structured as a block of data to be appended to a distributed register.

\* \* \* \* \*